United States Patent
Kizhepat et al.

(10) Patent No.: US 8,352,626 B1
(45) Date of Patent: *Jan. 8, 2013

(54) PROGRAM SELECTION FROM WITHIN A PLURALITY OF ACTIVE VIDEOS

(75) Inventors: Govind Kizhepat, Los Altos Hills, CA (US); Yung-Hsiao Lai, Fremont, CA (US); Erik Matthew Nystrom, Santa Clara, CA (US)

(73) Assignee: Vyumix, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/425,459

(22) Filed: Mar. 21, 2012

Related U.S. Application Data

(63) Continuation-in-part of application No. 13/252,296, filed on Oct. 4, 2011, which is a continuation-in-part of application No. 13/237,874, filed on Sep. 20, 2011, which is a continuation-in-part of application No. 13/154,222, filed on Jun. 6, 2011.

(51) Int. Cl.
*G06F 15/16* (2006.01)
*G06F 13/00* (2006.01)
*H04B 1/66* (2006.01)

(52) U.S. Cl. ............ 709/231; 375/240.12; 725/41

(58) Field of Classification Search .......... 709/201–236; 725/46–200; 348/441, 701–723
See application file for complete search history.

(56) References Cited

U.S. PATENT DOCUMENTS

| | | | |
|---|---|---|---|
| 5,408,274 | A | 4/1995 | Chang |
| 5,513,181 | A | 4/1996 | Bresalier |
| 5,594,507 | A | 1/1997 | Hoarty |
| 5,691,768 | A | 11/1997 | Civanlar |
| 5,872,874 | A | 2/1999 | Natarajan |
| 6,034,678 | A | 3/2000 | Hoarty |
| 6,064,377 | A | 5/2000 | Hoarty |
| 6,100,883 | A | 8/2000 | Hoarty |
| 6,205,582 | B1 | 3/2001 | Hoarty |
| 6,253,238 | B1 | 6/2001 | Lauder |
| 6,931,660 | B1 | 8/2005 | Kalluri |
| 7,127,619 | B2 | 10/2006 | Unger |

(Continued)

FOREIGN PATENT DOCUMENTS

EP 2343891 A2 7/2011

OTHER PUBLICATIONS

U.S. Appl. No. 13/369,169, filed Feb. 8, 2012, entitled "Video Transcoder Stream Multiplexing Systems and Methods".

(Continued)

*Primary Examiner* — Joseph Avellino
*Assistant Examiner* — Mark O Afolabi
(74) *Attorney, Agent, or Firm* — Adams Intellex, PLC

(57) ABSTRACT

A video streamer aggregates multiple videos into a single video stream for delivery to a client to be displayed. The multiple videos are active to allow motion of the multiple videos to be shown. The multiple videos are part of an electronic program guide. Additional information related to one or more of the videos may be obtained and displayed by the client. One of the videos may be selected to be enlarged and/or have audio from that video played.

15 Claims, 6 Drawing Sheets

U.S. PATENT DOCUMENTS

| | | | |
|---|---|---|---|
| 7,408,961 | B2 | 8/2008 | Kaku |
| 7,499,416 | B2 | 3/2009 | Polomski |
| 7,516,136 | B2 | 4/2009 | Lee |
| 7,516,243 | B2 | 4/2009 | Wee |
| 7,543,326 | B2 | 6/2009 | Moni |
| 7,555,006 | B2 | 6/2009 | Wolfe |
| 7,555,718 | B2 | 6/2009 | Girgensohn |
| 7,634,795 | B2 | 12/2009 | Dureau |
| 7,636,395 | B2 | 12/2009 | Yongfang |
| 7,647,413 | B2 | 1/2010 | Kirkland |
| 7,675,873 | B2 | 3/2010 | Krstulich |
| 7,676,590 | B2 | 3/2010 | Silverman |
| 7,698,365 | B2 | 4/2010 | Van Buskirk |
| 7,720,023 | B2 | 5/2010 | Bais |
| 7,734,692 | B1 | 6/2010 | Kaplan |
| 7,738,766 | B2 | 6/2010 | Silverman |
| 7,778,206 | B2 | 8/2010 | Shaffer |
| 7,783,767 | B2 | 8/2010 | Collazo |
| 7,792,062 | B1 | 9/2010 | Fandrianto |
| 7,864,808 | B2 | 1/2011 | Krause |
| 7,903,815 | B2 | 3/2011 | Bacon |
| 7,996,863 | B2* | 8/2011 | Wiltheiler ........................ 725/38 |
| 2003/0159143 | A1* | 8/2003 | Chan ................................ 725/41 |
| 2005/0008240 | A1 | 1/2005 | Banerji |
| 2005/0278742 | A1* | 12/2005 | Komar ............................. 725/46 |
| 2006/0179469 | A1* | 8/2006 | Fransman et al. ............ 725/115 |
| 2007/0028288 | A1 | 2/2007 | Sigmon, Jr. et al. |
| 2007/0200923 | A1 | 8/2007 | Eleftheriadis et al. |
| 2008/0127272 | A1* | 5/2008 | Cragun et al. .................... 725/46 |
| 2008/0162713 | A1 | 7/2008 | Bowra et al. |
| 2008/0170622 | A1 | 7/2008 | Gordon |
| 2008/0178249 | A1 | 7/2008 | Gordon |
| 2009/0041118 | A1 | 2/2009 | Pavlovskaia et al. |
| 2009/0123123 | A1 | 5/2009 | Piesing |
| 2010/0122294 | A1 | 5/2010 | Craner |
| 2010/0141833 | A1 | 6/2010 | Lemmers |
| 2010/0158109 | A1 | 6/2010 | Dahlby et al. |
| 2011/0102671 | A1 | 5/2011 | Tsai |
| 2011/0145865 | A1 | 6/2011 | Simpson |
| 2011/0158113 | A1 | 6/2011 | Nanda |
| 2011/0200093 | A1* | 8/2011 | Gabara et al. ............ 375/240.01 |
| 2012/0117193 | A1* | 5/2012 | Phillips et al. ................. 709/219 |

OTHER PUBLICATIONS

Vbrick, "MPEG-2 Transport vs. Program Stream," VBrick Systems Inc., Wallingford, CT, p. 1-10, 2007.

Magnum Semiconductor, "DX7313," Magnum Semiconductor, Milpitas, CA, p. 1-2; downloaded from www.magnumsemi.com on Jun. 2, 2011.

Vixs, "Broadcast Professional Series," ViXS Systems, Toronto, Ontario, p. 1-2; downloaded from www.vixs.com on Jun. 2, 2011.

Chang et al., "Manipulation and Compositing of MC-DCT Compressed Video," IEEE J. Selected Areas in Comm., IEEE Communications Society, New York, NY, 13(1):1-11, Jan. 1995.

Chang, "Compositing and Manipulation of Video Signals for Multimedia Network Video Services," Ph. D Thesis, University of California Berkeley, Berkeley, CA, p. 1-212, 1993.

ITU-T, "H.264 (Mar. 2010), Advanced video coding for generic audiovisual services," Telecommunication Standardization Sector of ITU, Geneva, Switzerland, p. 1-676, Mar. 2010.

\* cited by examiner

PROGRAM SELECTION FROM WITHIN A PLURALITY OF ACTIVE VIDEOS

This application is a continuation-in-part of U.S. patent application "Program Selection from Multiple Video Channels" Ser. No. 13/252,296, filed Oct. 4, 2011 which is a continuation-in-part of U.S. patent application "Single Stream Generation for Multiple Independent Videos" Ser. No. 13/237,874, filed Sep. 20, 2011 which is a continuation-in-part of U.S. patent application "Scalable Real-Time Video Compositing Systems and Methods" Ser. No. 13/154,222, filed Jun. 6, 2011. Each of the foregoing applications is hereby incorporated by reference in its entirety.

FIELD OF INVENTION

This application relates generally to video streaming and more particularly to program selection from within a plurality of multiple active videos.

BACKGROUND

Streaming of video content remains a complex and difficult technical challenge. From locating videos, to head-end storage of video content, to the delivery of the requested videos, all aspects of the video streaming system must be carefully designed and implemented. The complex delivery problem is further complicated when multiple videos may be of interest to the requester or to a viewer. Again, careful techniques and algorithms must be developed in order for proper searching and for content delivery to be efficient, timely, and effective. Complex software and hardware systems are required to implement a video collection and delivery system. In such a system, the software may be stored and executed on a variety of processors.

There may be many challenges involved in a complex, user-driven, video content delivery system. For example, one difficulty might be to effectively and efficiently locate video content on the web. A search might be fine-tuned through a variety of means to make the search more efficient and targeted toward content of interest. The results of the search may be presented as text or as still images and may include uniform resource locators (URL) for the various videos. A user may then be able to view a video by selecting a particular result returned by the search. A browser or other web enabled application may use the URL provided by the search to contact the source of the video. The source of the video may then stream the video to the user.

SUMMARY

Multiple active videos may be streamed in a single video stream to a client machine. The single video stream may be a single elementary stream or packetized elementary stream. One of the multiple active videos may be selected and the selected video, or more information on the selected video, may then be displayed. A computer implemented method for video selection is disclosed comprising: receiving a plurality of active videos wherein the plurality of active videos is received in a single video stream; displaying the plurality of active videos on a client machine; receiving a selection for one of the plurality of active videos to identify a selected video; and displaying the selected video from the plurality of active videos as a primary video. The displaying of the plurality of active videos may be part of an electronic program guide. The receiving a selection may include selecting a video from the plurality of active videos for display as the primary video. The method may further comprise obtaining more information related to the selected video. The more information may include additional video information. The more information may include audio. The more information may include metadata. The method may further comprise: obtaining information related to one or more videos from the plurality of active videos; and displaying the information with the plurality of active videos on the client machine wherein the information includes one or more of start time, end time, video duration, rating, price, and ranking The displaying the information may include overlaying the information on at least a portion of the plurality of active videos. Base information may be shown for each of the plurality of active videos. The client machine may be a mobile device. The primary video may be shown on a full screen display. The primary video may be shown on another device. The another device may be a television screen. The plurality of active videos may include broadcast video. The plurality of active videos may include cable television video. The plurality of active videos may include live video.

In embodiments, a computer program product embodied in a non-transitory computer readable medium for video selection may comprise: code for receiving a plurality of active videos wherein the plurality of active videos is received in a single video stream; code for displaying the plurality of active videos on a client machine; code for receiving a selection for one of the plurality of active videos to identify a selected video; and code for displaying the selected video of the plurality of active videos as a primary video. In some embodiments, a system for video selection may comprise: a memory which stores instructions; one or more processors attached to the memory wherein the one or more processors, when executing the instructions which are stored, are configured to: receive a plurality of active videos wherein the plurality of active videos is received in a single video stream; display the plurality of active videos on a client machine; receive a selection for one of the plurality of active videos to identify a selected video; and display the selected video of the plurality of active videos as a primary video. In embodiments, a computer implemented method for streaming video may comprise: providing a plurality of active videos wherein the plurality of active videos is aggregated into a single video stream; receiving a selection for one of the plurality of active videos; modifying the single video stream to provide more information related to the one of the plurality of active videos which was selected thereby creating a modified video stream; and outputting the modified video stream.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

The present disclosure provides a description of various methods, apparatus, and systems for selecting a streaming video from multiple videos. As more and more content is delivered across the internet in video form, the selection of video becomes more problematic. Historically a search may return a snapshot from one frame of the video along with some descriptive text. Little of the video content can actually be conveyed with this limited format and the result may even be misleading or even deceptive. In accordance with the present disclosure, a video stream may be provided where the video stream includes multiple active videos. The multiple videos, which may be found through a variety of methods that may include an internet search, are aggregated into a single video stream and sent to a client machine. The single video stream may include four, eight, sixteen, or some other number of videos. All of the videos may be simultaneously active. One or more of the videos may come from a live video feed such as a network program, a news broadcast, a sporting event, or the like.

The video stream may be played with a typical media player on the client machine such as RealPlayer™, Windows Media Player™, a web browser with video capability (such as a Flash™ plug in), or the like. Since the multiple videos are included in a single video stream this type of typical media players can play the single video stream, resulting in the multiple videos being seen by a user. In other embodiments, a specialized video player may be utilized. In some embodiments the video stream may be displayed as a part of an electronic program guide (EPG). One of the videos included in the video stream may be selected, and the selected video may be displayed as a primary video display, which may be a full screen display in some cases. In some embodiments, more information about the selected video may be obtained and displayed, such as an audio track, a larger version of the video, metadata related to the video, or other types of information. The video and/or audio may each be buffered so that proper playback is uninterrupted.

Figure 1:
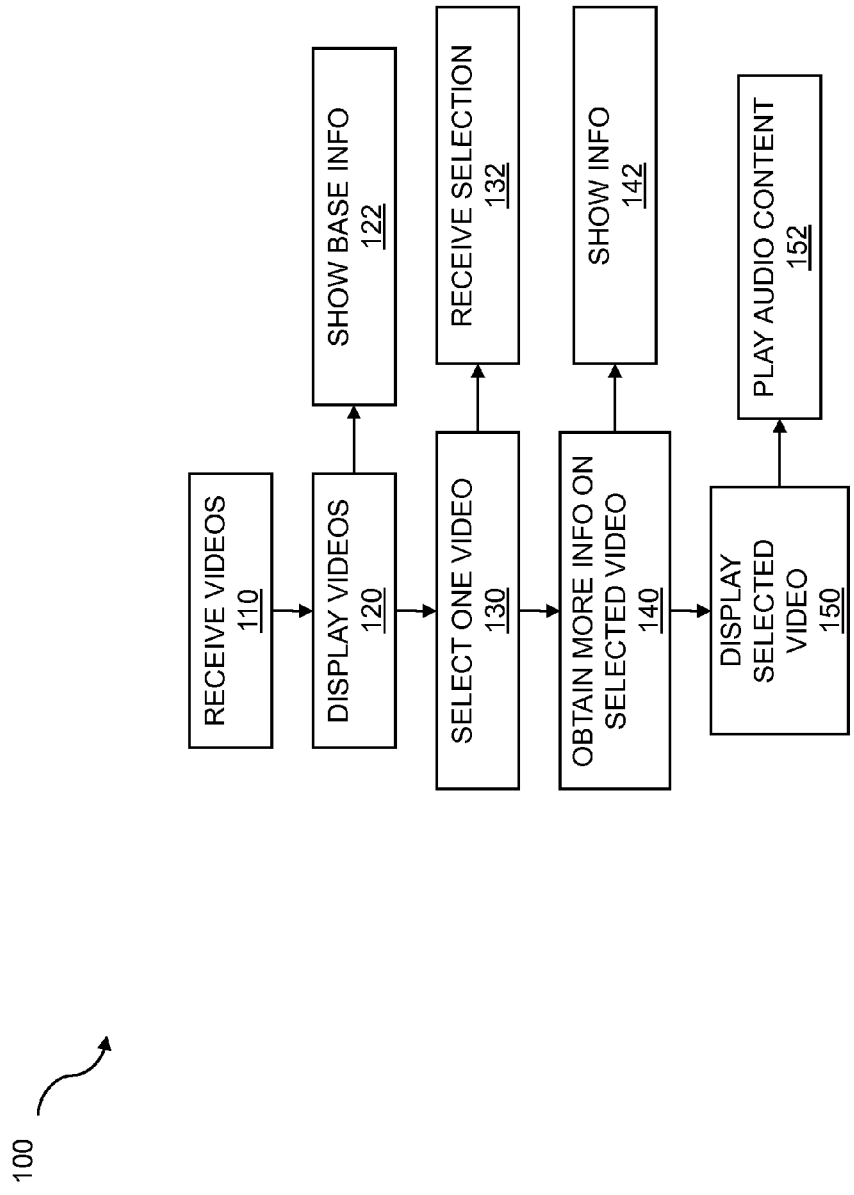
FIG. 1 is a flow diagram for video selection.

FIG. 1 is a flow diagram for video selection. The flow 100 describes a computer implemented method for video selection and may represent activity from a client perspective. The computer implemented method may involve a client-server interaction. One or more client machines may be attached to a network. A server may be attached to the clients through an internet or intranet type network. The network may be wired, wireless, or a combination thereof. The flow 100 begins with receiving a plurality of active videos 110 wherein the plurality of active videos is received in a single video stream. The single video stream may have been created by aggregating multiple videos into the single video stream. Active video means that the visible content of that video is being updated on a regular basis, such as 16, 24, 30 or some other number of frames per second (fps), although various embodiments may use higher refresh rates such as 60 fps or more, or lower refresh rates such as 10 fps or less. The videos may have been chosen based on a search query from the client, a request for a particular collection of videos, or by some other method that may be under the control of the client, the server, a content controller, or some other entity. In some embodiments, a portion of a video may be shown for one or more of the plurality of active videos. The portion may be a trailer, a snippet, a video sample, a repeating group of frames, a video loop, and so on. The portion may last for 10 seconds, 30 seconds, or some other amount of time before repeating.

A single video stream may be a single elementary stream, or packetized elementary stream or some other technology where one frame or field of video to be displayed at any one point in time. As used herein, a transport stream or program stream, having multiple elementary streams of video, may not be a single video stream, although if a transport stream or program stream has only a single elementary video stream, or its equivalent, that transport or program stream may still be considered a single video stream. Elementary stream, program stream, and transport stream are used herein consistently with the terms as defined by the motion picture experts group (MPEG) in standards such as MPEG 1, MPEG 2, MPEG 4, or other MPEG standard, but may apply more broadly than the specific definitions of those standards. Other embodiments may utilize different technology where multiple videos may be aggregated into a single video stream that is not simply a collection of multiple video streams.

The flow 100 continues with displaying the plurality of active videos 120 on a client machine. The displaying of the plurality of active videos may be part of an electronic program guide. This displaying may be accomplished by displaying the single video stream that contains the plurality of active videos. In some embodiments, the plurality of active videos may be displayed as a full-screen display. In other embodiments, the plurality of active videos, or a portion thereof, may be shown in a window or a portion of the display. The plurality of active videos may be shown on any electronic display, including but not limited to, a computer display, a laptop screen, a net book screen, a tablet computer, a cell phone display, a mobile device display, a remote with a display, or some other electronic display. In some cases there may be two or more displays. The plurality of active videos may be shown on one display with a selected video being shown on a second or third display and so on. In some embodiments, the plurality of active videos may be shown as a part of the display of another application and base information may be shown 122 such as the title of one or more of the videos, or other textual information about one or more of the videos. A user or viewer may select one video 130 from the plurality of active videos. The selection process may take place by numerous methods and may depend on the type of device that is used as the client machine. In some embodiments, such as where a personal computer is used as the client machine, a keyboard and/or mouse may be used to select the one video. In some embodiments the user may click on a video to select it, may use arrow keys to select a video, or may type in an identifier of the desired video. In other embodiments, such as a smart phone or a tablet, the user may simply touch the desired video to select it using a touch screen. Other methods of selecting the video may also be used, including, but not limited to, a remote control, voice commands, eye tracking, gesture recognition, or any other method. The flow 100 may include receiving a selection 132 for one of the plurality of active videos to identify a selected video. The plurality of active videos may comprise an electronic program guide. The electronic program guide may provide a reference where a viewer can select from multiple videos to watch where the multiple videos are displayed and playing simultaneously within a window. The electronic program guide may be for currently available videos, either available to be streamed or playing currently through live feeds or a combination thereof.

The flow 100 may continue by obtaining more information related to the selected video 140. Some embodiments may include obtaining information related to one or more of the videos of the plurality of active videos, including unselected videos in some embodiments. The more information obtained can be any type of information related to the selected video or any of the other videos from the plurality of active videos. In some embodiments, the more information includes additional video information. Additional video information may include a higher resolution version of the video, additional frames of the video to increase the frame rate of the video, a version of the video having a lower compression for higher quality, more color information to improve the fidelity of the video, or any other information related to the visible content of the video that may be used to supplement, or be used in place of, the original video information included in the single video stream. In many embodiments, the more information includes audio. The audio may include a single monaural or multi-channel sound track for the video, and/or may include other audio information, such as related music, commentary, or the sound track in other languages. In some embodiments, the more information includes metadata. Metadata may be any type of information related to the video including textual information, audio information, related videos, still images, executable applications, URLs, tags, or any other type of data. In some cases information may include data that may be useful to identify the video such as one or more of title, actors' names, copyright date, synopsis, start time, end time, video duration, rating, price, and ranking of the video. In some embodiments, the more information may be shown 142 to the user and may include any or all of the more information obtained. The more information may be shown without the videos in some embodiments but other embodiments may include displaying the information with the plurality of active videos on the client machine.

Figure 5:
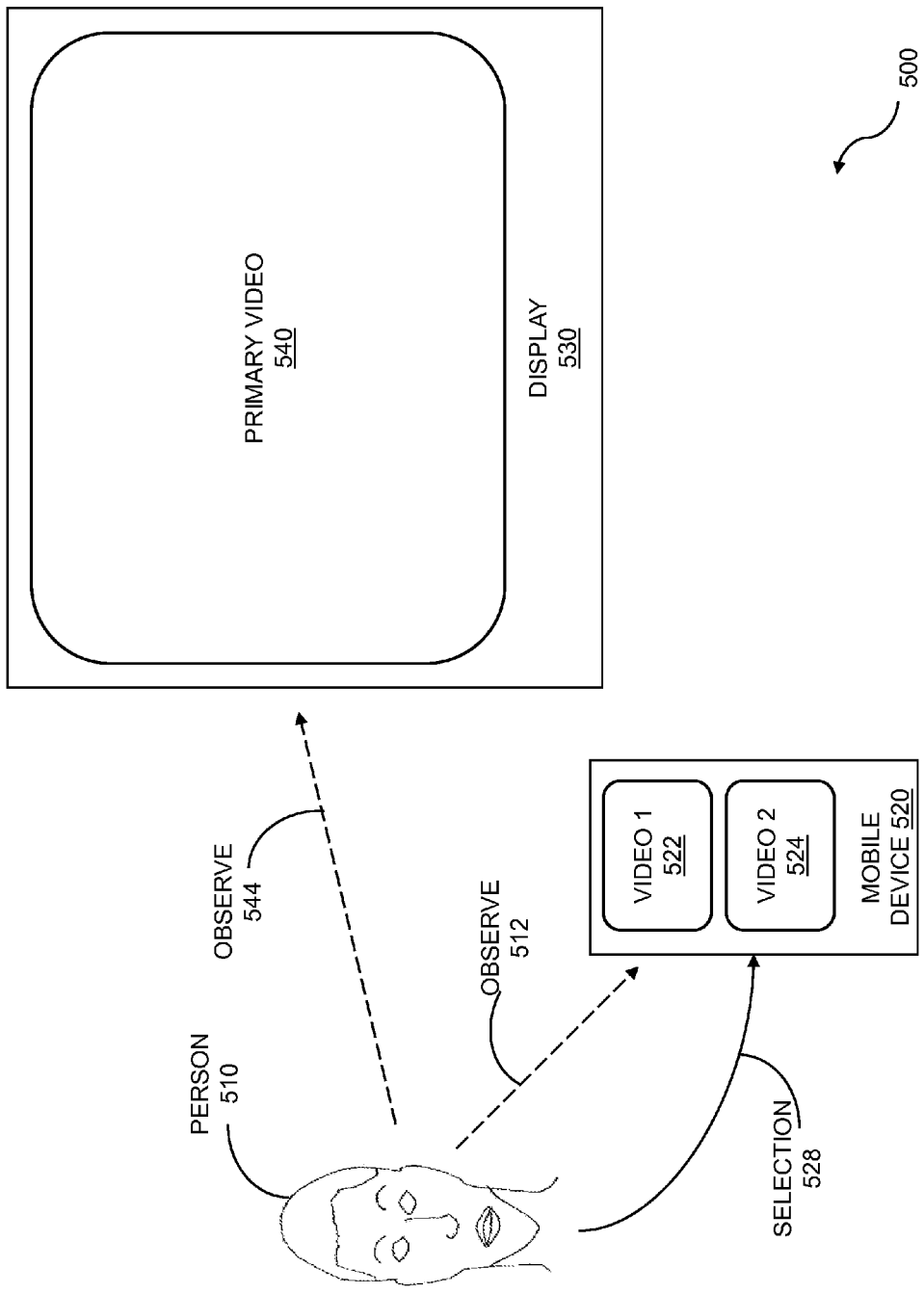
FIG. 5 is a system diagram of video selection for primary display.

The flow 100 continues by displaying a selected video 150 from the plurality of active videos as a primary video. The primary video may be based on receiving a selection that includes a video from the plurality of active videos for display. The primary video may be shown on a screen that is connected to, or is a part of, the client machine in some embodiments. In other embodiments, the primary video may be shown on a separate device that is not the client machine such as a television, monitor, or other device. An example is illustrated in FIG. 5, which will be explained in more detail below. In embodiments, the selected video may be played from a video file stored in a database. In other embodiments, the selected video may be played from the original file, location, or link where the video was originally found on a web site, on a live video feed, from dedicated content, and so on. In embodiments, the selected video may be shown in its original context such as a web site that contained the video. In some embodiments, when the video is selected transfer may be accomplished to a web site or web application containing the video. In some cases this transfer may involve opening a new window or tab within a browser where a web page is shown.

The more information related to the selected video may be presented to the user depending on the embodiment and the type of information. If the more information is a sound track or other audio information, the audio content may be played 152 along with the selected video. If the more information is additional video information, the upgraded video stream may be displayed. Various steps in the flow 100 may be changed in order, repeated, omitted, or the like without departing from the disclosed inventive concepts. Various embodiments of the flow 100 may be included in a computer program product embodied in a non-transitory computer readable medium that includes code executable by one or more processors.

Figure 2:
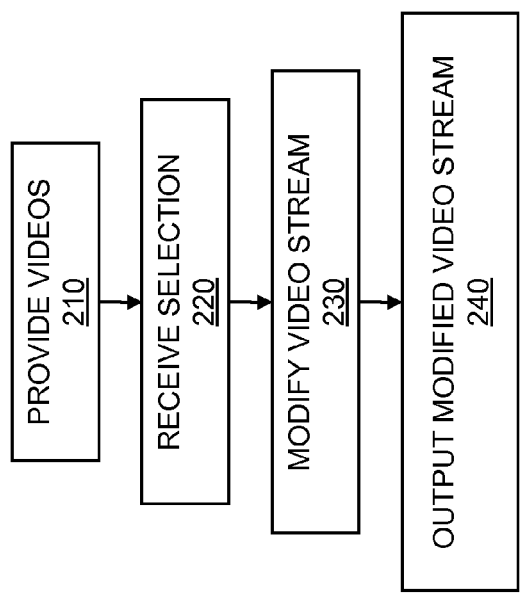
FIG. 2 is a flow diagram for providing selected videos.

FIG. 2 is a flow diagram for providing selected videos. The flow 200 describes a computer implemented method for providing selected videos and may represent activity from a server perspective. The computer implemented method may involve a client-server interaction. A server may be attached to one or more client machines through an internet or intranet type network. The network may be wired, wireless, or a combination thereof. The flow 200 begins with providing a plurality of active videos 210 wherein the plurality of videos is aggregated into a single video stream. The single video stream may have been created by aggregating multiple independent videos from one or more locations into the single video stream to be sent to a client machine. The flow 200 continues with receiving a selection 220 for one of the plurality of active videos. The selection may be sent to the server from a client machine after a user has selected a video from the plurality of videos aggregated into the single video stream.

The server may continue by modifying the single video stream 230 to provide more information about the video which was selected thereby creating a modified video stream. The video stream may be modified by including any of the items described above as more information, including, but not limited to, additional video, audio, and/or metadata information. In at least one embodiment, the video stream may be modified by including the more information in a program stream or transport stream that includes the video stream. In another embodiment, the video stream may be modified by replacing the video stream with a higher bit rate video stream. In some embodiments, the more information may be embedded into a single elementary stream with the video. Other embodiments may include the more information along with the original single video stream, which may be considered as modifying the single video stream simply by providing the more information. After modification, the single video stream might not include a plurality of video streams but may, in some embodiments, include only the selected video stream and/or information related to the selected video stream. Flow 200 continues with outputting the modified video stream 240. The modified video stream may be sent to the client machine that sent the selection. Various steps in the flow 200 may be changed in order, repeated, omitted, or the like without departing from the disclosed inventive concepts. Various embodiments of the flow 200 may be included in a computer program product embodied in a non-transitory computer readable medium that includes code executable by one or more processors.

Figure 3:
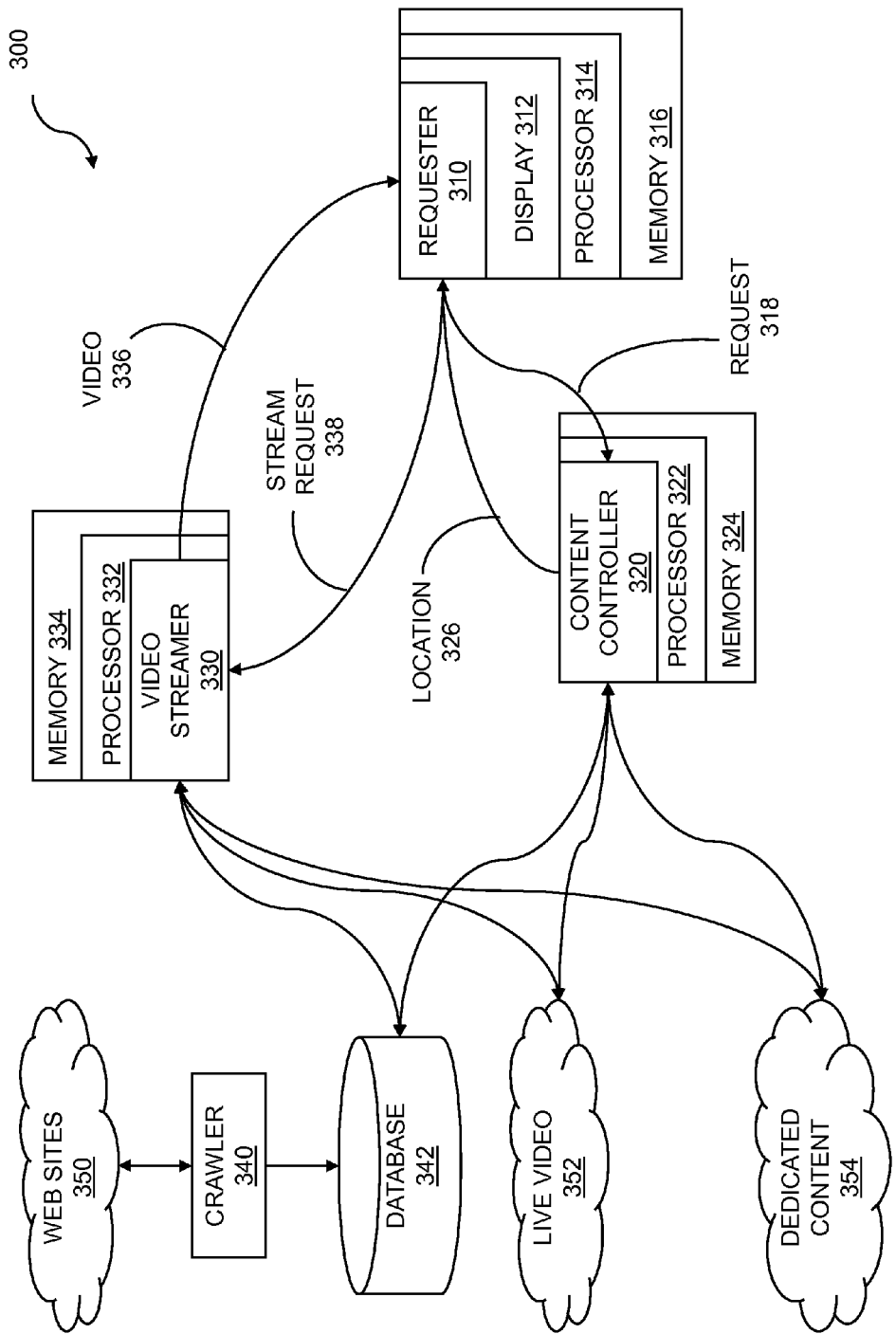
FIG. 3 is a system diagram for handling videos.

FIG. 3 is a system diagram for handling videos. A system 300 includes a requester 310, a content controller 320, a video streamer 330, a database 342, and a crawler 340. A requester 310 may be a client machine, such as a personal computer, a set top box, a television, or some other electronic device in some embodiments. In other embodiments the client machine may be a mobile device such as a smart phone, tablet, personal digital assistant (PDA), or the like. The requester 310 may have one or more viewers or users who view videos on one or more displays 312. The one or more viewers may view videos on a display 312 that may be attached to the requester 310 in some embodiments. The requester 310 may include one or more processors 314 for executing instructions stored in one or more memories 316. The memory 316 may be used for storing instructions, for temporary video and audio storage, for system support, and the like. A viewer may take action, such making an entry using a mouse, keyboard, and/or touch screen, that may cause the requester 310 to send a request 318 for information to a content controller 320. The content controller 320 may receive the request 318 for video content and access databases for the video information. The request 318 may travel through various networks including both wireless and wired connections and may traverse the Internet. The request 318 may be a search query or some other request for an alert or other information related to videos.

The content controller 320 may be a server machine and may have one or more processors 322 which may execute instructions stored in one or more memories 324. The memory 324 may be used for storing instructions, for temporary storage, for system support, and the like. The content controller 320 may send queries and obtain responses from various repositories which contain videos or information on videos. Based on the responses which the content controller 320 receives from the repositories, a location 326 may be sent back to the requester 310. The requester 310 may receive the location 326 in response to the request 318. The location may include a uniform resource locator (URL) where the requester 310 machine can find videos. The location may include a group of video identifiers associated with videos which are relevant to the request 318 which the requester 310 sent to the content controller 320. A URL address may include the video identifiers as part of the address which is sent for the location 326. In some embodiments, the location 326 may be sent directly to a video streamer 330 by the content controller 320. In some embodiments, the content controller 320 and the video streamer 330 may be part of the same machine or server and the content controller 320 and the video streamer 330 may share processors and/or memories.

The repositories for videos or video information may include one or more databases 342, live feed videos 352, dedicated content 354, and the like. Live video 352 may include broadcast, cable, and other televised materials that may include video of action being delivered in near real time with the action taking place and/or may include video that has been recorded or stored and is being delivered at a later time than the action occurred. Live video 352 may include web camera, security feeds, and other cameras from a variety of locations that may be delivered as it is captured or may have been captured at an earlier time. Dedicated content 354 may include videos provided by advertisers, educators, commercial companies, non-profits, and other sources of video material. In some embodiments, dedicated content 354 may include subscriber oriented web portals, such as Netflix™, Hulu™, and the like. So the plurality of active videos includes live video in some embodiments, including embodiments where the plurality of active videos includes broadcast video and embodiments where the plurality of active videos includes cable television video.

A web crawler 340 may obtain video information from across the Internet as well as, in some cases, an intranet, to identify videos. The web crawler 340 may be considered as a web agent, a web bot, a web robot, a web spider, or other program which orders information found across the web. The crawler 340 may traverse a series of web sites 350 to collect information on videos. A database 342 may store the video information which was collected. The videos themselves may be stored in the database 342 or information on the videos, including where the videos may be retrieved. The crawler 340 may also traverse various live video 352 feeds and dedicated content 354 providers. In some embodiments, the crawler 340 may obtain information from a social network which includes videos or links to videos.

The requester 310 may send the location 326 obtained from the content controller 320 to a video streamer 330 as a stream request 338. In some embodiments, the video identifiers provided with the location 326 may be analyzed by the requester 310. In some embodiments, the requester may choose a subset of the videos associated with the video identifiers to send in the stream request 338 to the video streamer 330. The video streamer 330 may have one or more processors 332 which may execute instructions stored in one or more memories 334. The memory 334 may be used for storing instructions, for temporary storage, for system support, and the like. The video streamer 330 may obtain videos from databases 342, live video 352 feeds, and dedicated content 354 sources as well as other locations. The video streamer 330 aggregates a plurality of active videos into a single video stream to provide the video stream as a video 336 to the requester 310. In some embodiments, the video streamer reduces the amount of video content included in one or more of the plurality of active videos since the videos will be shown on only a portion of a display. One or more of the plurality of active videos may include a live feed video such as a news broadcast or sporting event.

Figure 4:
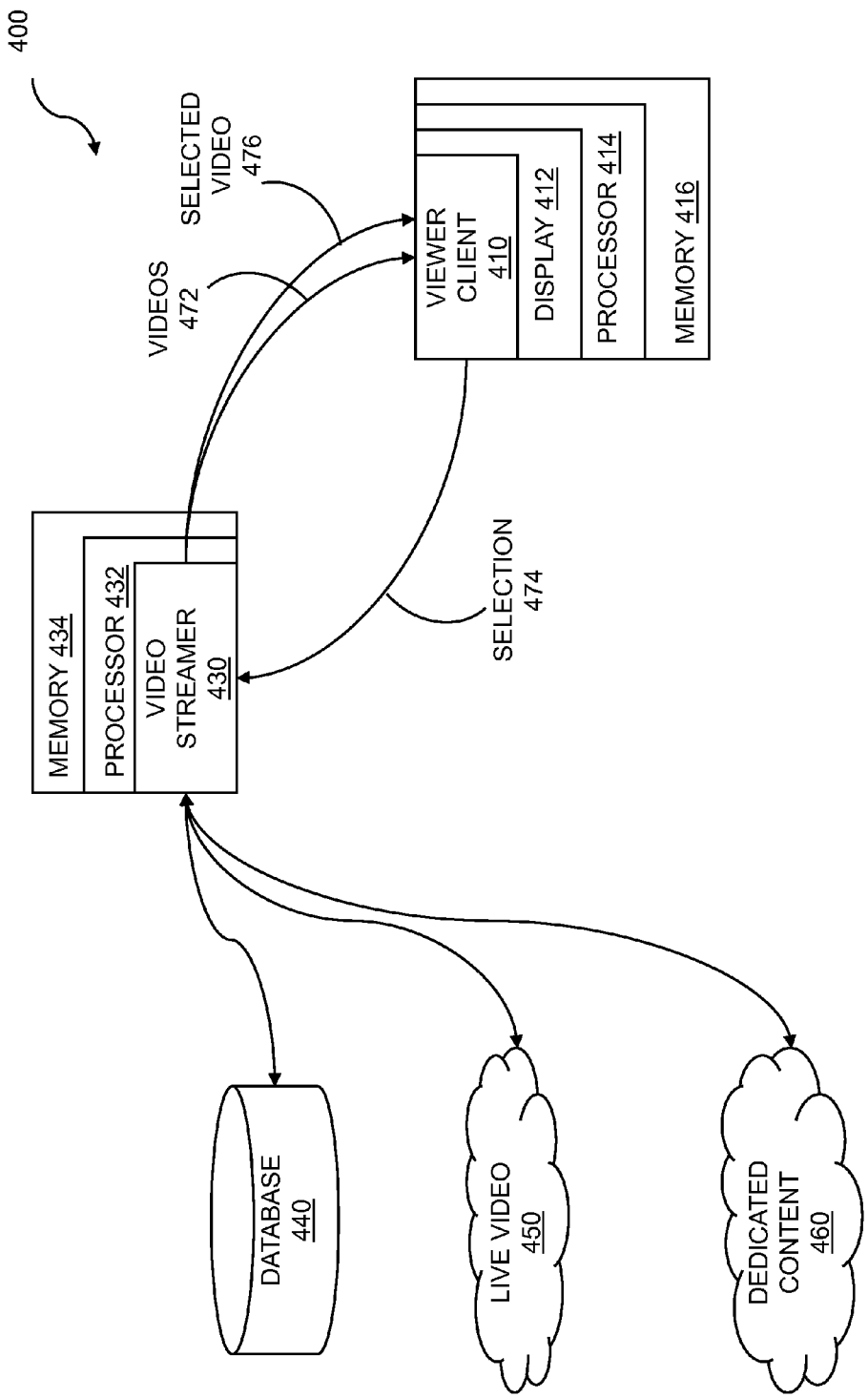
FIG. 4 is a system diagram showing provision of videos.

FIG. 4 is a system diagram showing provision of videos. The system 400 includes a viewer client 410 that includes a display 412. A display 412 that is attached to a viewer client 410 by a cable or other type of connection may be considered a part of the viewer client 410. In some embodiments, multiple displays may be used where one display 412 shows a plurality of active videos 472 and a second display shows a selected video 476. The viewer client 410 may be a client machine. The viewer client 410 includes one or more processors 414 attached to memory 416. The one or more processors 414 may be able to execute the instructions stored in the memory 416. The viewer client 410 may be the same component as the requester 310. The system 400 also includes a video streamer 430. The video streamer 430 includes one or more processors 432 that may be able to execute instructions stored in a memory 434. The video streamer 430 may access video content and/or other content from a variety of sources including, but not limited to, a database 440, live video 450, and/or dedicated content 460. The video streamer 430 may aggregate a plurality of videos from one or more sources into a single video stream 472 and send the videos to the viewer client 410.

The viewer client may receive a plurality of active videos 472 wherein the plurality of active videos is received in a single video stream and display the plurality of active videos on a client machine. A user or viewer of the plurality of active videos may take action on the viewer client 410 to select a video of the plurality of active videos. The viewer client may then send that selection 474 to the video streamer 430. The video streamer 430 may obtain additional information related to the selected video and modify the video stream based on the additional information. The selected video 476 may then be sent to the viewer client to display a selected video of the plurality of active videos as a primary video display. The system 400 may include computer program product embodied in a non-transitory computer readable medium for video selection comprising: code for receiving a plurality of active videos wherein the plurality of active videos is received in a single video stream; code for displaying the plurality of active videos on a client machine; code for receiving a selection for one of the plurality of active videos to identify a selected video; and code for displaying a selected video of the plurality of active videos as a primary video display. The system 400 may include a memory which stores instructions; one or more processors attached to the memory wherein the one or more processors, when executing the instructions which are stored, are configured to: receive a plurality of active videos wherein the plurality of active videos is received in a single video stream; display the plurality of active videos on a client machine; receive a selection for one of the plurality of active videos to identify a selected video; and display a selected video of the plurality of active videos as a primary video display.

FIG. 5 is a system diagram of video selection for primary display. The system 500 may be used by a person 510 who may observe 512 the display of a mobile device 520. In the embodiment shown, the client machine is a mobile device 520. A mobile device may be any type of portable device that may be powered by an internal power source such as a battery, fuel cell, kinetic energy harvester, wireless power receiver, or other portable power source. The mobile device may be a smart phone, tablet, personal digital assistant (PDA), a purpose-built electronic device, a remote, or the like and include a display. The mobile device 520 may show the plurality of active videos that is received from a video streamer, including video 1 522 and video 2 524, to the person 510. In embodiments, two, four, eight, 16, or some other number of active videos may be shown for possible selection. The person 510 may determine which video is desired and make a selection 528 to choose between the two videos. The selection may be done in many different ways, but may be done using the touch screen of the mobile device 520 in at least some embodiments. The mobile device 520 may send the selection 528 to the video streamer, which may modify the video stream to include more information about the selected video and send out the modified video stream.

While in some embodiments, the modified video stream may be sent to the mobile device for use as the primary video display to the person 510, in other embodiments, the modified video stream may be sent to another device, such as display 530, to show the primary video display 540. So, in some embodiments, the primary video is shown on another device that is not the client machine. In some embodiments, the another device is a television screen. In the embodiment shown, the primary video is shown on a full screen display, although it may be shown in a portion of the screen, such as in a window, in other embodiments. The person 510 may observe 544 the primary video display 540.

Figure 6:
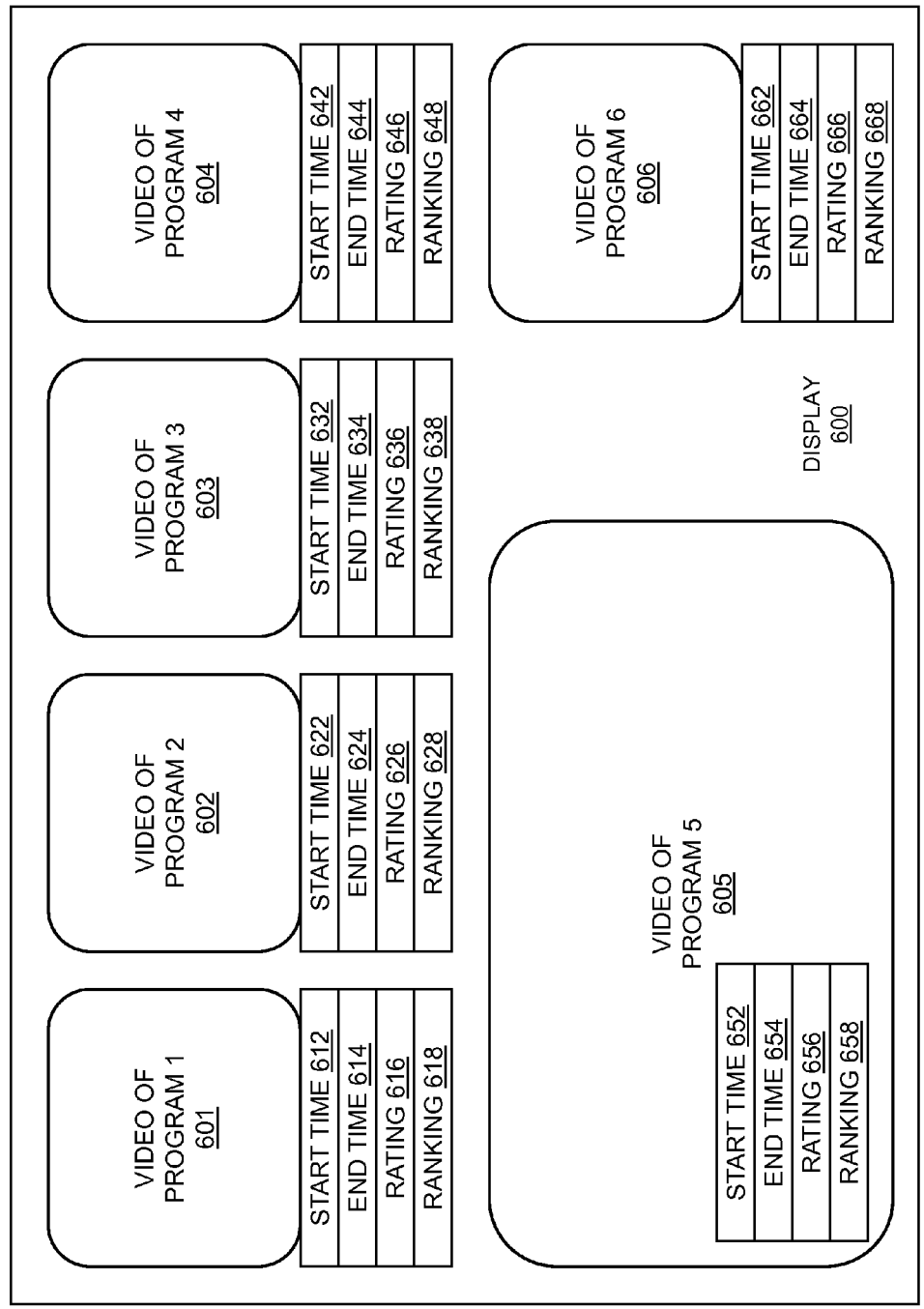
FIG. 6 is an example program guide with active videos.

FIG. 6 is an example program guide with active videos. A display 600 is shown with an electronic program guide showing a first video 601, a second video 602, a third video 603, a fourth video 604, a fifth video 605, and a sixth video 606. Thus, in some embodiments, the displaying of the plurality of active videos is part of displaying an electronic program guide. The display 600 may be shown on an electronic display such as a computer display, a laptop screen, a net book screen, a tablet computer, a cell phone display, a mobile device display, a remote with a display, or some other electronic display. The display 600 may include multiple windows or may just show a single window. In embodiments, two or more of the videos are active and are showing motion. In many cases, all of the videos within the display 600 are active videos. Various numbers of active videos are possible including four, seven, eight, sixteen or some other number of videos. In the embodiment shown, six videos are displayed simultaneously. The videos may be of different sizes on the display 600 so that the plurality of active videos may be presented in a heterogeneous tile configuration. One or more tiles in the heterogeneous tile configuration may be larger than other tiles, in the heterogeneous tile configuration, such the fifth video 605. The one or more tiles which are larger may be selected by a user or may be automatically selected based on relevance to a request. One of the one or more tiles may provide audio content which is played. The audio content may be selected by a user on a client machine. Alternatively, the audio content may be selected based on relevance to a search query. In some embodiments, one or more of the plurality of active videos includes an advertisement.

The electronic program guide may show a variety of textual information describing aspects of the various videos, which may be referred to as base information. In the example shown, base information is shown for each of the plurality of active videos. For the first video 601, base information of a start time 612, end time 614, rating 616, and ranking 618 may be shown below the video. For the second video 602, base information of a start time 622, end time 624, rating 626, and ranking 628 may be shown below the video. For the third video 603, base information of a start time 632, end time 634, rating 636, and ranking 638 may be shown below the video. For the fourth video 604, base information of a start time 642, end time 644, rating 646, and ranking 648 may be shown below the video. For the fifth video 605, base information of a start time 652, end time 654, rating 656, and ranking 658 may be shown overlaid on the top of the fifth video 605. For the sixth video 606, base information of a start time 662, end time 664, rating 666, and ranking 668 may be shown below the video below the video. Other embodiments may display more, less, or different base information and yet other embodiments may not show base information. In some embodiments, the displaying the information includes overlaying the information on at least a portion of the plurality of active videos as shown for the fifth video 605. Overlaying of base information may allow for larger videos to be displayed without leaving out the base information.

Each of the above methods may be executed on one or more processors on one or more computer systems. Embodiments may include various forms of distributed computing, client/server computing, and cloud based computing. Further, it will be understood that for each flow chart in this disclosure, the depicted steps or boxes are provided for purposes of illustration and explanation only. The steps may be modified, omitted, or re-ordered and other steps may be added without departing from the scope of this disclosure. Further, each step may contain one or more sub-steps. While the foregoing drawings and description set forth functional aspects of the disclosed systems, no particular arrangement of software and/or hardware for implementing these functional aspects should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. Each element of the block diagrams and flowchart illustrations, as well as each respective combination of elements in the block diagrams and flowchart illustrations, illustrates a function, step or group of steps of the methods, apparatus, systems, computer program products and/or computer-implemented methods. Any and all such functions may be implemented by computer program instructions, by special-purpose hardware-based computer systems, by combinations of special purpose hardware and computer instructions, by combinations of general purpose hardware and computer instructions, by a computer system, and so on. Any and all of which may be generally referred to herein as a "circuit," "module," or "system."

A programmable apparatus that executes any of the above mentioned computer program products or computer implemented methods may include one or more processors, microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are not limited to applications involving conventional computer programs or programmable apparatus that run them. It is contemplated, for example, that embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized. The computer readable medium may be a non-transitory computer readable medium for storage. A computer readable storage medium may be electronic, magnetic, optical, electromagnetic, infrared, semiconductor, or any suitable combination of the foregoing. Further computer readable storage medium examples may include an electrical connection having one or more wires, a portable computer diskette, a hard disk, a random access memory (RAM), a read-only memory (ROM), an erasable programmable read-only memory (EPROM), Flash, MRAM, FeRAM, phase change memory, an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. Each thread may spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the entity causing the step to be performed.

While the invention has been disclosed in connection with preferred embodiments shown and described in detail, various modifications and improvements thereon will become apparent to those skilled in the art. Accordingly, the spirit and scope of the present invention is not to be limited by the foregoing examples, but is to be understood in the broadest sense allowable by law.

What is claimed is:

1. A computer implemented method for video selection comprising:
   receiving a plurality of active videos wherein the plurality of active videos is received in a single video stream wherein:
   at least one of the plurality of active videos is a live video feed; and
   the single video stream is generated based on a server collecting the plurality of active videos
   displaying the plurality of active videos on a client machine wherein the client machine is a mobile device;
   receiving a selection for one of the plurality of active videos to identity a selected video;
   displaying the selected video from the plurality of active videos as a primary video wherein the displaying of the plurality of active videos is part of an electronic program guide and wherein the plurality of active videos are displayed on the client machine and wherein the selected video is displayed as the primary video on another device;
   obtaining information related to one or more videos from the plurality of active videos; and
   displaying the information with the plurality of active videos on the client machine wherein the information includes one or more of start time, end time, video duration, rating, price, and ranking as part of the electronic program guide.

2. The method of claim 1 wherein the receiving a selection includes selecting a video from the plurality of active videos for display as the primary video.

3. The method of claim 1 further comprising obtaining more information related to the selected video.

4. The method of claim 3 wherein the more information includes additional video information.

5. The method of claim 3 wherein the more information includes audio.

6. The method of claim 3 wherein the more information includes metadata.

7. The method of claim 1 wherein the displaying the information includes overlaying the information on at least a portion of the plurality of active videos.

8. The method of claim 1 wherein base information is shown for each of the plurality of active videos.

9. The method of claim 1 wherein the primary video is shown on a full screen display.

10. The method of claim 1 wherein the another device is a television screen.

11. The method of claim 1 wherein the plurality of active videos includes broadcast video.

12. The method of claim 1 wherein the plurality of active videos includes cable television video.

13. A computer program embodied in a non-transitory computer readable medium for video selection, the computer program product comprising:
- code for receiving a plurality of active videos wherein the plurality of active videos is received in a single video stream wherein:
- at least one of the plurality of active videos is a live video feed; and
- the single video stream is generated based on a server collecting the plurality of active videos
- code for displaying the plurality of active videos on a client machine wherein the client machine is a mobile device;
- code for receiving a selection for one of the plurality of active videos to identity a selected video;
- code for displaying the selected video from the plurality of active videos as a primary video wherein the displaying of the plurality of active videos is part of an electronic program guide and wherein the plurality of active videos are displayed on the client machine and wherein the selected video is displayed as the primary video on another device;
- code for obtaining information related to one or more videos from the plurality of active videos; and
- code for displaying the information with the plurality of active videos on the client machine wherein the information includes one or more of start time, end time, video duration, rating, price, and ranking as part of the electronic program guide.

14. A system for video selection comprising:
a memory which stores instructions;
one or more processors attached to the memory wherein the one or more processors, when executing the instructions which are stored, are configured to:
receiving a plurality of active videos wherein the plurality of active videos is received in a single video stream wherein:
at least one of the plurality of active videos is a live video feed; and
the single video stream is generated based on a server collecting the plurality of active videos
displaying the plurality of active videos on a client machine wherein the client machine is a mobile device;
receiving a selection for one of the plurality of videos to identity a selected video;
displaying the selected video from the plurality of active videos as a primary video wherein the displaying of the plurality of active videos is part of an electronic program guide and wherein the plurality of active videos are displayed on the client machine and wherein the selected video is displayed as the primary video on another device;
obtaining information related to one or more videos from the plurality of active videos; and
displaying the information with the plurality of active videos on the client machine wherein the information includes one or more of start time, end time, video duration, rating, price, and ranking as part of the electronic program guide.

15. A computer implemented method for video selection comprising:
providing a plurality of active videos wherein the plurality of active videos is aggregated into a single video stream wherein:
at least one of the plurality of active videos is a live video feed; and
the single video stream is provided based on a server collecting the plurality of active videos
the single video stream is part of an electronic program guide;
receiving a selection for one of the plurality of active videos;
obtaining information related to one of the plurality of active videos wherein the information includes one or more of start time, end time, video duration, rating, price, and ranking as part of the electronic program guide;
modifying the single video stream to provide the information related to the one of the plurality of active videos which was selected thereby creating a modified video stream; and
outputting the modified video stream to a client machine wherein the client machine is a mobile device.

* * * * *